Feb. 1, 1927. 1,616,423
V. F. SLEZAK
SEALING DEVICE
Original Filed March 24, 1926
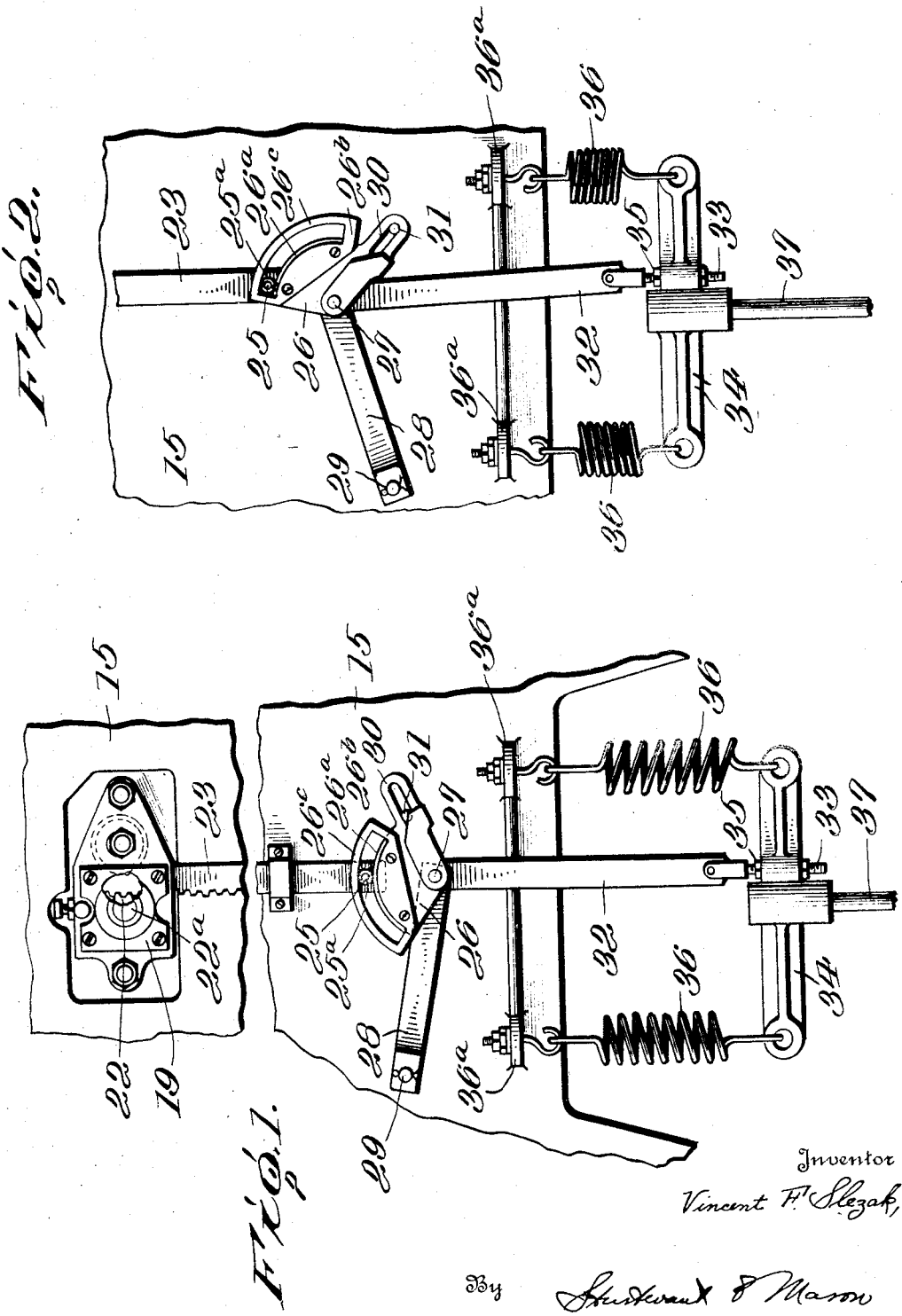

Patented Feb. 1, 1927.

1,616,423

UNITED STATES PATENT OFFICE.

VINCENT F. SLEZAK, OF CHICAGO, ILLINOIS.

SEALING DEVICE.

Original application filed March 24, 1926, Serial No. 97,034. Divided and this application filed August 2, 1926. Serial No. 126,671.

This invention relates to improvements in weighing machines, and more particularly bears upon the sealing device for calibrating the machine for accurate reading.

It has heretofore been proposed to provide various types of transmission mechanisms for transferring the energy of movement of a platform under the actuation of a weight to be measured into an indicating device. It is mechanically difficult, if not impossible, to make all parts of such machines identical among themselves so that one part may be replaced by its congener without disturbance of the accuracy of the indication. For reasons of quick and easy manufacture it has therefore been customary to provide means for regulating the machine so that any initial irregularities are compensated and the final indication at the indicating instrumentality is an accurate statement of the weight to be measured.

The present invention proposes a characteristic and peculiar transmitting mechanism for the delivery of an indication when a weight to be measured is placed upon the machine. This mechanism has already been described and disclosed in my copending application Serial No. 97,034, filed March 24, 1926, of which the present application is a division.

By virtue of the assembly, means are provided for calibrating the parts so that they are competent of manual adjustment during assembly, to produce accurate indications.

Another feature is that the calibrating surface is of relatively great extent so that the device presents a distinct portion to correspond to each particular weight to be measured in a position predetermined by the weight itself.

These and other features of the invention will appear in the course of the following specification and claims.

On the accompanying drawings:

Fig. 1 is an elevation of the mechanism in a weight supporting and indicating position, at approximately two-thirds of the capacity of the weighing machine.

Fig. 2 is a similar view in the position of rest or of no load.

Referring in detail to these drawings, the main supporting plate 15 represents the same element as in my aforesaid pending application and constitutes a part of the machine frame which is rigidly supported against movement and upon which the various operative members are mounted. The weighing platform may be of the type shown in my copending application and serves when a weight is superimposed thereon to draw the weighing rod 37 downward. This weighing rod has the bracket 34 connected thereto to receive the lower ends of the weighing springs 36, which are fixedly supported at their upper ends to projecting lugs 36ª on the plate 15. A threaded connecting member 33 having the adjusting nuts 35 thereon pivotally supports the weighing link 32 so that this link is moved in exact accordance with the movement of the weighing rod 37: and since the latter distorts the springs 36 in proportion to the weight to be measured, the link 32 moves in accordance therewith.

Pivotally mounted at a fixed point 29 of the plate 15 is the swinging link 28. The sealing segment or cam plate 26 is connected to the weighing link 32 and the swinging link 28 by a common pivot member 27 about which it may rock. It will be understood that the axis of the pivot 27 is substantially the center of the arcuate upper edge of cam surface 26ª of the sealing segment 26. The offset slotted arm 30 projects from the sealing segment 26 and constitutes a moving guide pivot for the sealing segment 26 by its engagement with a pin 31 which is fixed on the plate 15. A rack bar 23 is guided for vertical movement upon the plate 15. At its lower end this rack bar has a projecting pin 25 which carries an antifriction roller 25ª. This roller rests upon the upper edge of cam surface 26ª of the sealing segment. The upper end of the rack 23 has teeth to engage with a pinion 22 which is splined to the shaft 22ª of an indicating mechanism such as a dial of the printing wheel shown in my copending application: since the particular type of indicating mechanism employed is not of the essence of this invention, it will be indicated conventionally as being mounted upon the shaft 22ª and located on the opposite side of the plate 15. A suitable bearing and support 19 is provided for the rack and the pinion so that they remain in engagement and make exact and proportionate movements.

A guard plate 26ᵇ is bolted to the face of the sealing segment 26 and is provided with a slot which is arcuate about the axis of the pivot 27, and receives with a slight amount of play the antifriction roller 25ª supported on the rack 23. This guard plate 26ᵇ has a guard member 26ᶜ which is adapted to be brought into contact with the upper surface of this antifriction roller for the purpose to be set forth hereinafter. The lower edge of the slot is below the cam surface, so that it does not interfere with the contact of the roller 25ª therewith.

The method of operation of the device is as follows: When a weight to be measured is placed upon the machine platform, the weighing rod 37 will pull downward on the springs 36 until an equilibrium is established. During this downward movement of the bracket 34, the weighing link 32 pulls downward upon the sealing segment and causes the latter to move bodily downward. During this movement of the segment, the engagement of the pin 31 in the slotted arm 30 of the segment will cause the latter to rock in proportion to its bodily movement; since, however, the cam surface 26ª is substantially concentric with the axis of the pivot 27, no substantial change in the position of height of the topmost portion of the edge of the sealing segment 26 need occur. During this bodily or rocking movement of the sector plate it is supported against an uncontrolled rocking movement by the swinging link 28.

The rack bar 23 is of sufficient weight and is so designed in its supports and guide that it falls by gravity when the sealing segment has been removed away from beneath it. It thus follows the sealing segment in its movement, but is not positively connected thereto. The antifriction roller 25ª on this rack 23 will rest substantially at the topmost part of the cam 26ª. The pinion 22 is moved by this rack in its downward gravitational movement to deliver the weighing indication.

Owing to differences in the springs which may be employed in such structures, as set forth above, the sealing segment may not have been moved to a proper position to indicate the correct measure of the weight upon the platform. An arbitrary adjustment is necessary for this; which is provided according to this invention by properly shaping the cam surface 26ª. It will be seen that this cam surface is at the top and easily visible to the assembler. Standard weights are placed upon the platform and the position of the indicating instrument for each weight is determined. The weighing springs 36 are then adjusted until for every weight within the capacity of the machine, the indication is just correct or is too low. One standard weight such as 50 lbs. is then placed upon the platform, and the deviation of the indicating instrument from a registry of 50 lbs. is noted, and then the segment 26 has its cam surface 26ª filed away until the antifriction roller 25ª, when seated in this newly calibrated position, will cause the indicating mechanism to registry accurately. A similar calibration is made for other weights, until the cam surface 26ª will at any position accord a correct registration at the indicating instrument.

This work of calibration is facilitated by the ready access and easy inspection afforded to this cam surface.

When a device is employed with a coin controlled weighing machine as shown in my copending application, it has been found that especially at the higher weights, the rack 23 in its slow gravitational movement sometimes requires an excessive time for the indicating instrument to register its final position. In order to positively draw the rack downward into an approximately correct location, the guard plate 26ᵇ is provided.

In the position of no load or at rest, as shown in Fig. 2, the antifriction roller 25ª is resting against the left hand end of the cam surface of the sealing segment 26. When a heavy load is placed upon the weighing platform, the weighing link 32 is drawn downward as before, and the sealing segment 26 moves bodily away from the antifriction roller 25ª. The guard member 26ᶜ, however, engages the upper surface of this antifriction roller and by it draws the rack 23 downward so that the indicating instrument gives an approximately correct measurement. Since, however, some force is required for this which has not been applied to the springs 36, and which will vary according to the weight and the conditions of load, it is apparent that this is merely a bringing into an approximately correct position. This movement occurs in a short interval of time after the weight has been placed on the machine. The rack 23 may now fall under the action of gravity until the antifriction roller 25ª is presented again against the upper surface of the sealing segment 26, at which an accurate calibrated indication will be afforded. The antifriction roller therefore cooperates both with the cam surface 26ª and the guard members 26ᶜ.

When the weight is removed from the weighing platform, the weighing link 32 will be forced upward by the action of the weighing springs 36 and in turn the sealing segment 26 will deliver an upward thrust against the antifriction roller 25ª and thereby restore the rack 23 and the indicating instrument to its zero position.

The invention is not limited to the specific form of embodiment shown, but may be modified within the scope of the appended claims.

I claim:

1. In a sealing apparatus for weighing machines having weighing springs and means to distort the same in proportion to the weight to be measured and a device to indicate such weight; a link having a fixed pivot, a link pivoted to and moving with said distorting means, a plate pivoted to the other ends of said links and having a slot therein, a pin on the machine frame received in said slot to guide the links and plate during the actuation of the distorting means, said plate having a cam surface at the top edge thereof, and a member resting by gravity on said cam surface for actuating said indicating device, the cam surface being calibrated to establish the accuracy of the reading of said device.

2. In a movement transmitting mechanism for weighing machines having a member actuated by the weight to be measured and an indicating instrumentality, a link moved substantially in the direction of its own length by said member according to the weight to be measured, a cam plate connected to said link, a driving device for said instrumentality supported in operative relation with the cam on said cam plate, and means to cause said cam plate to move during the movement of said link to present different portions of its cam to said device according to the weight to be measured, said cam having its operative surface so conformed that said instrumentality accurately indicates the weight acting upon said member.

3. In a movement transmitting mechanism for weighing machines having a member actuated by the weight to be measured and an indicating instrumentality, a link moved substantially in the direction of its own length by said member according to the weight to be measured, a cam plate connected to said link, a driving device for said instrumentality supported in operative relation with the cam on said cam plate, means to cause said cam plate to move during the movement of said link to present different portions of its cam to said device according to the weight to be measured, and auxiliary means to guide said link and plate in their movements, said cam having its operative surface so conformed that said instrumentality accurately indicates the weight acting upon said member.

4. In a sealing apparatus for weighing machines having a member actuated by the weight to be measured and an indicating instrumentality with a driving pinion, a weighing spring connected to the machine frame, a bracket connected to the other end of said spring, a weighing link pivoted to said bracket, a guide link having a fixed pivot, a cam plate having a slot, a common pivot for said links and plate, a pin on the machine frame in said slot to guide and rock the plate during movement of said weighing link, a rack meshing with said pinion and cooperating with said cam surface so that said instrumentality is caused to accurately indicate the weight upon said member, and means to guide said rack in its movements.

5. In a movement transmitting mechanism for weighing machines having a member actuated by the weight to be measured and an indicating instrumentality, a pivotally mounted sealing cam plate connected to said member so that it is rocked according to the movement thereof, a device to drive said instrumentality and resting against the cam on said cam plate and adapted to move under the action of gravity to follow the movement of said plate, and a guard on said plate to engage said device to move the latter positively downward into approximately its final position for the weight to be measured.

6. In a movement transmitting mechanism for a weighing machine having a member actuated by a weight to be measured and an indicating instrumentality, a plate connected to said member and moved bodily thereby according to the weight to be measured, means to rock said plate during its bodily movement, said plate having a sealing cam surface at its top, a device to drive said instrumentality and adapted to move under the action of gravity to follow the movements of said plate, an anti-friction roller on said device to rest against said cam surface, and a guard on said plate to engage said roller to move the device positively downwardly into approximately its final position for the weight to be measured.

7. In a sealing apparatus for a weighing machine having a member actuated by the weight to be measured and indicating instrumentality with a driving pinion, a rack bar meshing with said pinion and movable in a vertical line, a sealing segment, means on said bar to rest on the upper edge of said segment, a swinging link on which said sealing segment is pivoted, a vertical bar connected to said member and pivotally connected to said sealing segment at the radial center thereof, a slotted arm projecting from the circumference of said segment, and a fixed fulcrum pin adapted to engage the slot in said arm.

8. A weighing machine including in combination, a member actuated by the weight to be measured, an indicating instrumentality, a member to actuate said instrumentality, a plate pivotally connected to one of said members and having a segmental surface substantially concentric with such pivotal connection, said surface being in operative relation to said other member, and means for oscillating said plate so that a separate and definite point of said surface is presented to said other member for each particular weight being measured, whereby said surface may be scraped for the sealing of the weighing machine for accuracy.

9. A weighing machine including in combination, a member actuated by the weight to be measured, an indicating instrumentality, a rockably and vertically bodily shiftable plate, means connecting said member and plate to shift the latter vertically bodily according to the movement of the said member, a stationary member cooperating with said plate to rock the same during its shifting movement, said plate having a top sealing surface, and a device resting upon said sealing surface and in engagement therewith during the shifting and rocking of said plate to operate said instrumentality, so that said plate in its rocking movement presents a separate and definite point of said surface to said device for each particular weight being measured, whereby said surface may be scraped for the sealing of the weighing machine for accuracy.

10. A weighing machine including in combination, a member actuated by the weight to be measured and guided for substantially rectilinear movement during such actuation, an indicating instrumentality and an actuating member for the same guided to move substantially in line with said actuated member, an oscillating plate pivotally connected to one of said members and moving bodily therewith, said plate having a segmental surface thereon substantially concentric with said pivot and adapted to operatively engage said other member whereby to control the positioning of said instrumentality, and means for oscillating said plate during its bodily movement so that a separate and definite point of said surface is presented to said other member for each particular weight being measured, whereby said surface may be scraped for the sealing of the weighing machine for accuracy.

In testimony whereof, I affix my signature.

VINCENT F. SLEZAK.